United States Patent
Mercelat et al.

(10) Patent No.: US 10,122,542 B2
(45) Date of Patent: Nov. 6, 2018

(54) METHOD AND SYSTEM FOR CONTROLLING HOME-AUTOMATION DEVICES IN A DWELLING

(71) Applicant: DELTA DORE, Bonnemain (FR)

(72) Inventors: Joël Mercelat, Bonnemain (FR); Nathanaël Delahaye, Bonnemain (FR)

(73) Assignee: DELTA DORE, Bonnemain (FR)

( * ) Notice: Subject to any disclaimer, the term of this patent is extended or adjusted under 35 U.S.C. 154(b) by 0 days.

(21) Appl. No.: 15/561,103

(22) PCT Filed: Mar. 23, 2016

(86) PCT No.: PCT/EP2016/056453
§ 371 (c)(1),
(2) Date: Sep. 25, 2017

(87) PCT Pub. No.: WO2016/156165
PCT Pub. Date: Oct. 6, 2016

(65) Prior Publication Data
US 2018/0139068 A1 May 17, 2018

(30) Foreign Application Priority Data
Mar. 27, 2015 (FR) ...................................... 15 52610

(51) Int. Cl.
*H04L 12/28* (2006.01)
*G06F 3/0481* (2013.01)
(Continued)

(52) U.S. Cl.
CPC .......... *H04L 12/282* (2013.01); *G06F 3/0488* (2013.01); *G06F 3/04817* (2013.01);
(Continued)

(58) Field of Classification Search
CPC .............. H04L 12/282; G08C 2201/30; G08C 2201/93; G08C 17/02; G06F 3/04817; G06F 3/0488
(Continued)

(56) References Cited

U.S. PATENT DOCUMENTS

2014/0167931 A1* 6/2014 Lee ......................... G08C 17/02
340/12.5
2015/0319046 A1* 11/2015 Plummer ............ H04L 12/2807
715/736

FOREIGN PATENT DOCUMENTS

EP    1 453 345 A1    9/2004

OTHER PUBLICATIONS

Jun. 13, 2016 Search Report issued in International Patent Application No. PCT/EP2016/056453.

* cited by examiner

*Primary Examiner* — Inder Mehra
(74) *Attorney, Agent, or Firm* — Oliff PLC; R. Brian Drozd

(57) ABSTRACT

A method and system for controlling home-automation devices in a dwelling in which: a list of the home-automation devices is determined; each home-automation device is associated with an icon and with an alphanumeric identifier; an image of at least part of the dwelling is obtained; the image is displayed on the touch screen; a selection of an icon from a list of icons is detected; a positioning of the icon in the image and storage of the position of the icon determined is detected; a pressing on the image at the position of the stored icon is detected; and a command to the central unit intended for the home-automation device with which the icon is associated is generated and another icon linked to the (Continued)

icon the position of which is stored is displayed if the pressing at the position of the icon in the image is detected.

9 Claims, 7 Drawing Sheets

(51) Int. Cl.
    *G08C 17/02*         (2006.01)
    *G06F 3/0488*      (2013.01)

(52) U.S. Cl.
    CPC ......... *G08C 17/02* (2013.01); *G08C 2201/30* (2013.01); *G08C 2201/40* (2013.01); *G08C 2201/93* (2013.01)

(58) Field of Classification Search
    USPC ....... 340/3.21, 12.54, 13.38, 12.4, 4.3, 4.62, 340/12.22; 700/275; 348/333.01
    See application file for complete search history.

METHOD AND SYSTEM FOR CONTROLLING HOME-AUTOMATION DEVICES IN A DWELLING

BACKGROUND OF THE INVENTION

The present invention concerns a method, a device and a system for controlling home-automation devices in a dwelling.

Home automation is becoming more and more preponderant in dwellings.

Controlling home-automation devices becomes more and more complex for a user when the number of home-automation devices increases.

The use of a simple string of characters for identifying a home-automation device among a plurality of home-automation devices in a dwelling, or even a room in a dwelling, is now becoming limitative.

For example, a room comprises a plurality of openings, the closure of which is managed by home automation.

Naming the devices closing a room, roller blind, left right, is not sufficient for a user. This is because left and right depend on the position of the user in the room.

Naming lighting such as standard lamps in a room also poses the same concern.

This makes controlling such home-automation devices not very intuitive and therefore impractical in use.

BRIEF SUMMARY OF THE INVENTION

The aim of the present invention is to solve the drawbacks of the prior art by proposing a method, a device and a system for controlling home-automation devices in a dwelling that is intuitive and easy to use for any user.

To this end, according to a first aspect, the invention proposes a method for controlling home-automation devices in a dwelling, characterised in that the home-automation devices are controlled by a control device comprising a touch screen and which sends each command to a central unit that redirects the command to the home-automation device being controlled, the central unit being connected by radio link to the home-automation devices, the method comprising the steps of:
- determination, by the central unit and by means of the radio link, of the list of home-automation devices,
- association, by means of the control device, of each home-automation device with an icon and with an alphanumeric identifier,
- obtaining by the control device of an image of at least part of the dwelling,
- displaying by the control device of the image on the touch screen,
- detecting by the control device of a selection of an icon from a list of icons,
- detecting by the control device of a positioning of the icon in the image and storing the position of the icon determined,
- detecting by the control device of a pressing on the image at the position of the icon stored,
- generating by the control device of a command to the central unit and to the home-automation device with which the icon is associated or displaying of another icon linked to the icon, the position of which is stored if the pressing at the position of the icon in the image is detected.

The invention also relates to a system for controlling home-automation devices in a dwelling, characterised in that the home-automation devices are controlled by a control device comprising a touch screen and which sends each command to a central unit that redirects the command to the home-automation device being controlled, the central unit being connected by radio link to the home-automation devices, the system comprising:
- means, comprised in the central unit and by means of the radio link, for determining the list of home-automation devices,
- means, comprised in the control device, for associating each home-automation device with an icon and with an alphanumeric identifier,
- means, comprised in the control device, for obtaining an image of at least part of the dwelling,
- means, comprised in the control device, for displaying the image on the touch screen,
- means, comprised in the control device, for detecting a selection of an icon from a list of icons,
- means, comprised in the control device, for detecting a positioning of the icon in the image and storing the position of the icon determined,
- means, comprised in the control device, for detecting a pressing on the image at the position of the icon stored,
- means, comprised in the control device, for generating a command at the central unit and intended for the home-automation device with which the icon is associated or for displaying another icon related to the icon the position of which is stored if the pressing at the position of the icon in the image is detected.

Thus the present invention, by allowing the placing of icons on an image of a part of the dwelling, simplifies the use and control of home-automation devices.

According to a particular embodiment of the invention, the method further comprises the steps of:
- obtaining by the control device of a command to modify the visual appearance of the icon positioned in the image,
- modifying by the control device of the visual appearance of the icon positioned in the image.

Thus, if the icon occupies a large surface area in the image compared with the view of the home-automation device in the image, the present invention makes it possible to preserve the view of the home-automation device if the icon is close to it.

According to a particular embodiment of the invention, the modification of positioning of the icon consists of making the icon translucent or reducing the size of the icon.

Thus, if the icon occupies a large surface area in the image compared with the view of the home-automation device in the image, the present invention makes it possible to preserve the view of the home-automation device if the icon is close to it.

According to a particular embodiment of the invention, other images are obtained of the dwelling and the method comprises the steps of:
- displaying, by the control device, of reduced images of other obtained images,
- detecting by the control device of a selection of a reduced image of another image,
- displaying of the other image corresponding to the reduced image selected,
- detecting by the control device of a selection of an icon from a list of icons,
- detecting by the control device of a positioning of the icon in the other image and storing the position of the icon determined, detection by the control device of a pressing on the other image at the position of the stored icon, generation by the control device of a command to the central unit and intended for the home-automation device with which the icon is associated or display of another icon linked to the icon the position of which is stored if the pressing at the position of the icon in the image is detected.

Thus the present invention makes it possible to produce a different display for various rooms in a dwelling.

According to a particular embodiment of the invention, the home-automation devices are electrical appliances, sensors, lighting systems, curtain and blind devices, a heating system or an alarm unit.

According to a particular embodiment of the invention, the other icon linked to the icon the position of which is stored is a command with at least three possible states.

Thus the command is suited to certain home-automation devices such as curtain and blind systems on openings, or heating systems.

According to a particular embodiment of the invention, the other icon linked to the icon the position of which is stored consists of an invitation to enter a password.

Thus the present invention is suited to the control of controlled-access home-automation devices such as for example intruder alarms.

According to a particular embodiment of the invention, the method further comprises a step of disconnecting the steps of selecting an icon from a list of icons, of the obtaining by the control device of an image of at least part of the dwelling, of the detection by the control device of a selection of an icon from a list of icons and of the detection by the control device of a positioning of the icon in the image and storage of the position of the icon determined.

Thus it is possible to prevent persons, for example children or visitors, from modifying the configuration of the control device.

The invention also relates to the computer programs stored on an information carrier, said programs containing instructions for implementing the previously described methods when they are loaded into and executed by a computer system.

BRIEF DESCRIPTION OF THE SEVERAL VIEWS OF THE DRAWINGS

The features of the invention mentioned above, as well as others, will emerge more clearly from a reading of the following description of an example embodiment, said description being given in relation to the accompanying drawings, among which.

DETAILED DESCRIPTION OF THE INVENTION

Figure 1:
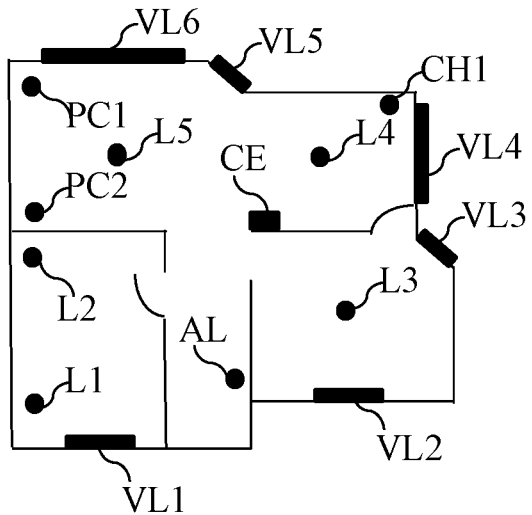
FIG. 1 shows an example of a dwelling in which the present invention is implemented.

FIG. 1 shows an example of a dwelling in which the present invention is implemented.

The dwelling comprises a plurality of rooms, the rooms comprising openings equipped with curtain or blind systems such as for example roller blinds VL1 to VL6, lighting systems L1 to L5, controlled electrical sockets PC1 and PC2, an anti-intrusion system AL and a heating and/or air-conditioning regulation control PC.

The dwelling also comprises a central unit CE that communicates by radio link with the home-automation devices. The central unit identifies the devices by carrying out an interrogation by means of the radio network connecting it to the home-automation devices, which reply to the interrogation. The central unit CE thus forms a list of home-automation devices, According to the present invention, a control device Com makes it possible to name and choose an icon for each home-automation device in the list formed. The list, enhanced with this information, is stored in the central unit CE and/or in the control device Com. The icons chosen are selected from a list of icons related to the type of home-automation device. For example, various icons are proposed for a lighting home-automation device, other icons are proposed for a curtain or blind home-automation device, other icons are proposed for a temperature-regulation home-automation device and other icons are proposed for an anti-intrusion system.

The curtain or blind and lighting systems, the electrical sockets, electrical apparatus, sensors and the anti-intrusion system are home-automation devices controlled by the present invention.

Naturally the present invention is not limited to the examples given with reference to FIG. 1.

According to the present invention:

the central unit CE, by means of the radio link, determines the list of home-automation devices, the central unit CE, by means of the control device, associates each home-automation device with an icon and with an alphanumeric identifier, the control device Com obtains an image of at least one part of the dwelling, the control device Com displays the image on the touch screen, the control device Com detects a selection of an icon from a list of icons, the control device Com detects a positioning of the icon in the image and stores the position of the icon determined, the control device Com detects a pressing on the image at the position of the stored icon, the control device Com generates a command at the central unit intended for the home-automation device with which the icon is associated or displays another icon linked to the icon the position of which is stored if the pressing at the position of the icon in the image is detected.

Figure 2:
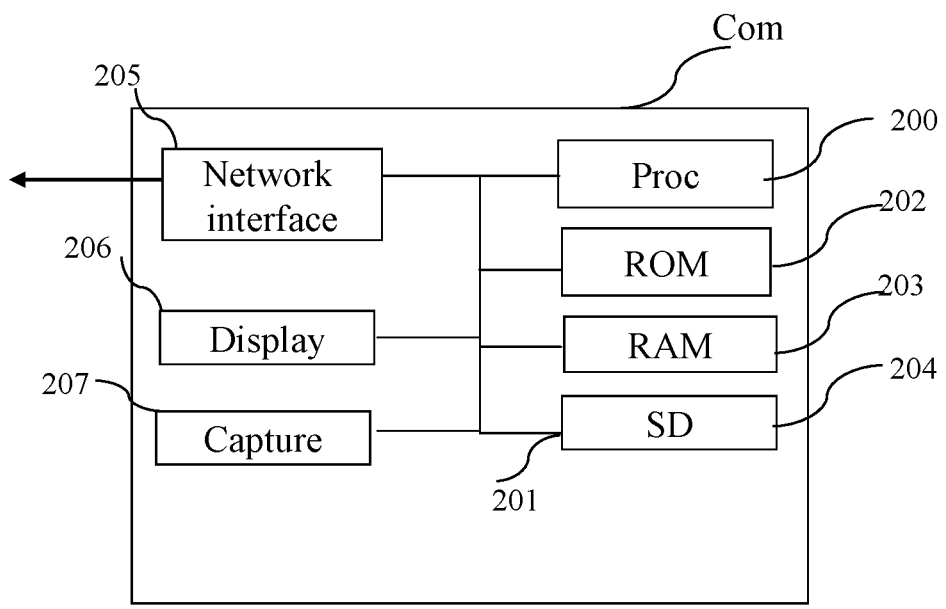
FIG. 2 shows a home-automation control device according to the present invention.

FIG. 2 shows a home-automation control device according to the present invention.

The home-automation control device Com comprises:
a processor, microprocessor or microcontroller 200;
a volatile memory 203;
a non-volatile memory 202;
optionally a storage medium reader 204, such as an SD card (secure digital card) reader or a hard disk for storing the documents processed by the present invention;
a wireless network interface 205,
a display 206,
an interface 207 for capturing commands made by the user of the home-automation control device Com,
a communication bus 201 connecting the processor 200 to the ROM memory 203, to the RAM memory 203, to the storage medium reader 204, to the wireless network interface 205, to the screen 206 and to the command-capture interface 207.

The home-automation control device Com is preferentially integrated in a smartphone or a tablet.

The command-capture interface is for example integrated in the screen 206, thus forming a touch screen.

The wireless network interface comprises for example a Wi-Fi interface, a cellular network interface or an interface of the Bluetooth type.

The processor 200 is capable of executing instructions loaded in the volatile memory 203 from the non-volatile memory 202, from an external memory (not shown), from a storage medium such as an SD card or the like, or from a communication network. When the home-automation control device Com is powered up, the processor 200 is capable of reading instructions from the volatile memory 203 and executing them. These instructions form computer programs that cause the implementation, by the processor 200, of all or some of the methods described in relation to FIGS. 5, 6, 7 and 8.

All of some of the methods described in relation to FIGS. 5, 6, 7 and 8 may be implemented in software form by the execution of a set of instructions by a programmable machine such as a DSP (digital signal processor) or a microcontroller or be implemented in hardware form by a machine or a dedicated component such as an FPGA (field-programmable gate array) or an ASIC (application-specific integrated circuit).

Figure 3:
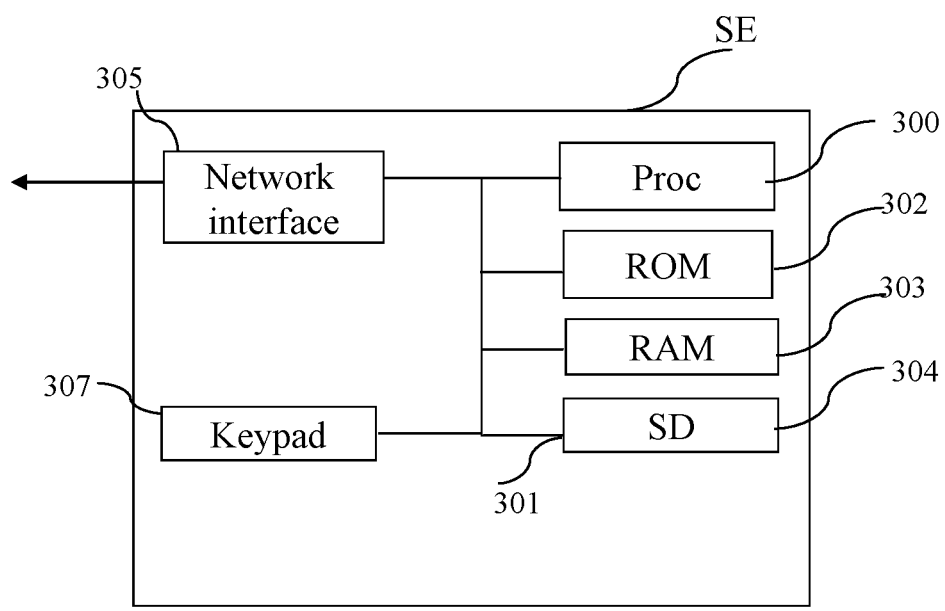
FIG. 3 shows a home-automation central unit according to the present invention.

FIG. 3 shows a home-automation central unit according to the present invention.

The home-automation central unit CE comprises:
a volatile memory 303;
a non-volatile memory 302;
optionally a storage medium reader 304, such as an SD card (secure digital card) reader or a hard disk for storing the documents processed by the present invention;
a network interface 305,
optionally a keypad 307,
a communication bus 301 connecting the processor 300 to the ROM memory 303, to the RAM memory 303, to the storage medium reader 304, to the network interface 305 and to the keypad 307.

The network interface 305 comprises a connection to the internet, for example Ethernet or Wi-Fi, or a cellular network interface.

The processor 300 is capable of executing instructions loaded into the volatile memory 303 from the non-volatile memory 302, from external memory (not shown), from a storage medium such as an SD card or the like, or from a communication network. When the central unit CE is powered up, the processor 300 is capable of reading instructions from the volatile memory 303 and executing them. These instructions form a computer program that causes the implementation, by the processor 300, of a part of the method described in relation to FIG. 5.

Figure 5:
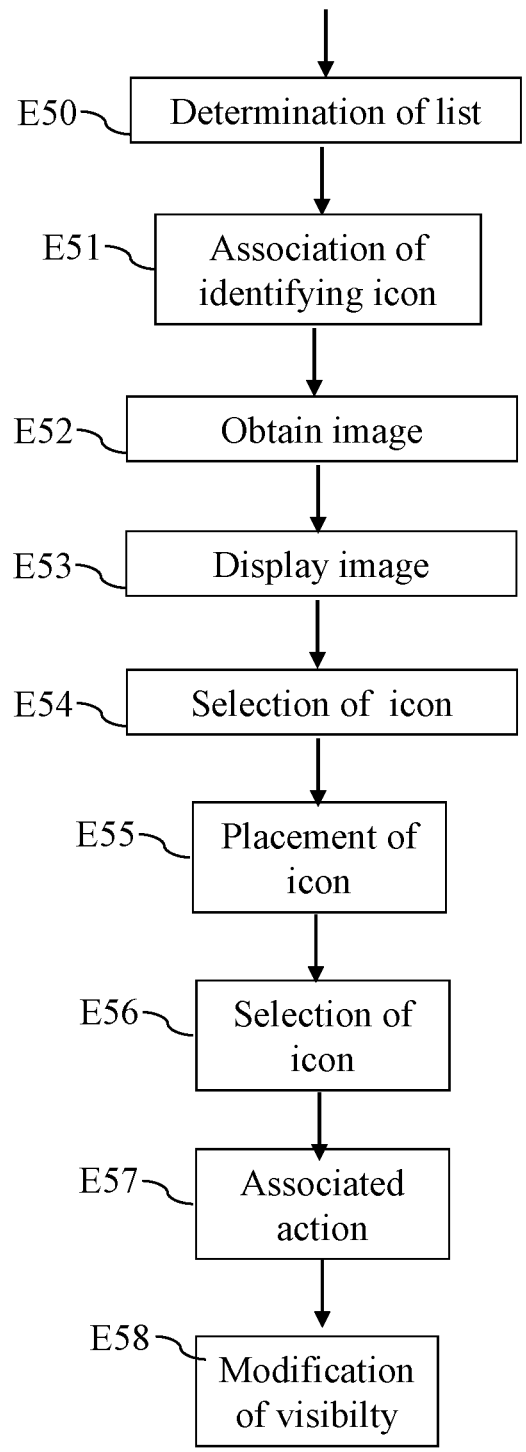
FIG. 5 shows an example of an algorithm for programming and generating home-automation commands according to the present invention.

The method described in relation to FIG. 5 can be implemented in software form by the execution of a set of instructions by a programmable machine such as a DSP (digital signal processor) or a microcontroller or be implemented in hardware form by a machine or a dedicated component such as an FPGA (field-programmable gate array) or an ASIC (application-specific integrated circuit).

Figure 4:
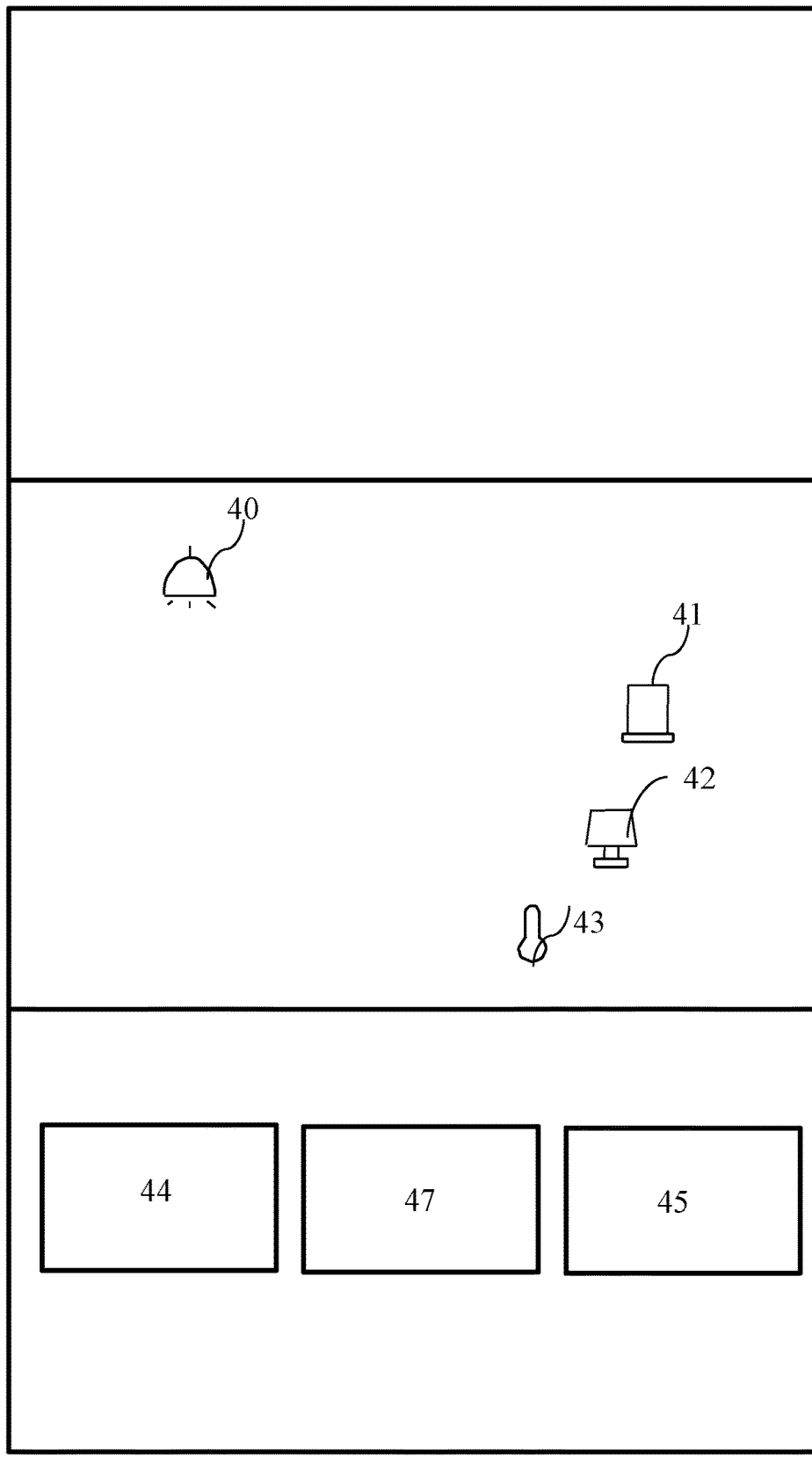
FIG. 4 shows a view of the display screen of the home-automation control device according to the present invention.

FIG. 4 shows a view of the display screen of the home-automation control device according to the present invention.

In the display screen given as an example in FIG. 4, four icons 40 to 43 are shown on a screen background composed of a picture of the room in which the various devices that can be controlled by the home-automation control device Com according to the present invention are situated. The icon denoted 40 represents a light that can be controlled according the present invention. The icon 41 represents a roller blind that can be controlled according to the present invention. The icon 42 represents a standard lamp connected to an electrical socket, which can be controlled according to the present invention, and the icon 43 represents a heating and/or air-conditioning system that can be controlled according to the present invention.

The icons are placed in the image close to the devices controlled so that the user can visually and unequivocally recognise which icon corresponds to the device that he wishes to control.

According to the present invention, the user of the home-automation control device Com can modify the position of the icon as he wishes.

In FIG. 4, the icons are visible. According to the present invention, the icons may be translucent so as to avoid any visual overload in the image. The user of the home-automation control device Com, by means of a predetermined command, modifies the visibility of all or some of the icons inserted in the image. The user of the home-automation control device Com also as he wishes, by means of a predetermined command, modifies the size of all or some of the icons inserted in the image.

In FIG. 4, three reduced images are shown. Each reduced image 44, 45 and 47 is a view of a room in the dwelling. When the user selects a reduced image, the latter appears at the bottom of the screen as well as the various icons inserted according to the present invention.

It should be noted here that the images shown in FIG. 4 are views of various rooms; in a variant, one or more images or views of a part or of a plurality of floors of the dwelling.

FIG. 5 shows an example of an algorithm, executed by the home-automation control device, for the programming of home-automation commands according to the present invention.

More precisely, step E50 is executed by the processor 300 of the central unit CE and steps E51 to E58 are executed by the processor 300 of the home-automation control device Com.

The present algorithm is implemented when the user of the home-automation control device Com configures the home-automation control device Com for controlling the various home-automation appliances present in his dwelling. The home-automation control device Com is preferentially a touch tablet or a smartphone on which an application is installed for implementing the present invention.

At step E50, the processor 300 controls the network interface 305 for the sending of an interrogation message over the radio link. The home-automation devices respond to the interrogation and the processor 300 thus forms a list of home-automation devices.

At step E51, the processor 200 demands the transfer by the radio link of a request for obtaining the list formed. From this list, the user of the control device Com names and chooses an icon for each home-automation device in the list formed. The list, enhanced with this information, is stored in the central unit CE and/or the names and icons are stored in the home-automation device.

At step E52, the processor 200 detects the pressing, by the user of the home-automation control device Com, on a reduced image denoted 36 in FIG. 3 which configures the home-automation control device Com for taking a picture.

The user of the home-automation control device Com takes for example a picture of each room in the dwelling or one or more pictures of a part or the whole of a floor of the dwelling that comprises home-automation devices to be controlled.

Each picture is stored in the memory of the home-automation control device Com.

At step E53, the processor 200 demands the display of an image on the touch screen.

At step E54, the processor 200 detects the selection of an icon from the list of icons.

At step E55, the processor 200 detects a positioning of the icon in the image and stores the position of the icon determined.

At step E56, the processor 200 detects a pressing on the image displayed on the touch screen at the position of the stored icon.

At step E57, the processor 200 generates a command to the central unit intended for the home-automation device with which the icon is associated or displays another icon linked to the icon the position of which is stored if the pressing at the position of the icon in the image is detected.

At the following step E58, the processor 200 modifies the visibility of the icon placed. The icon is for example visible translucently. In a variant, the size of the icon is modified.

Figure 6:
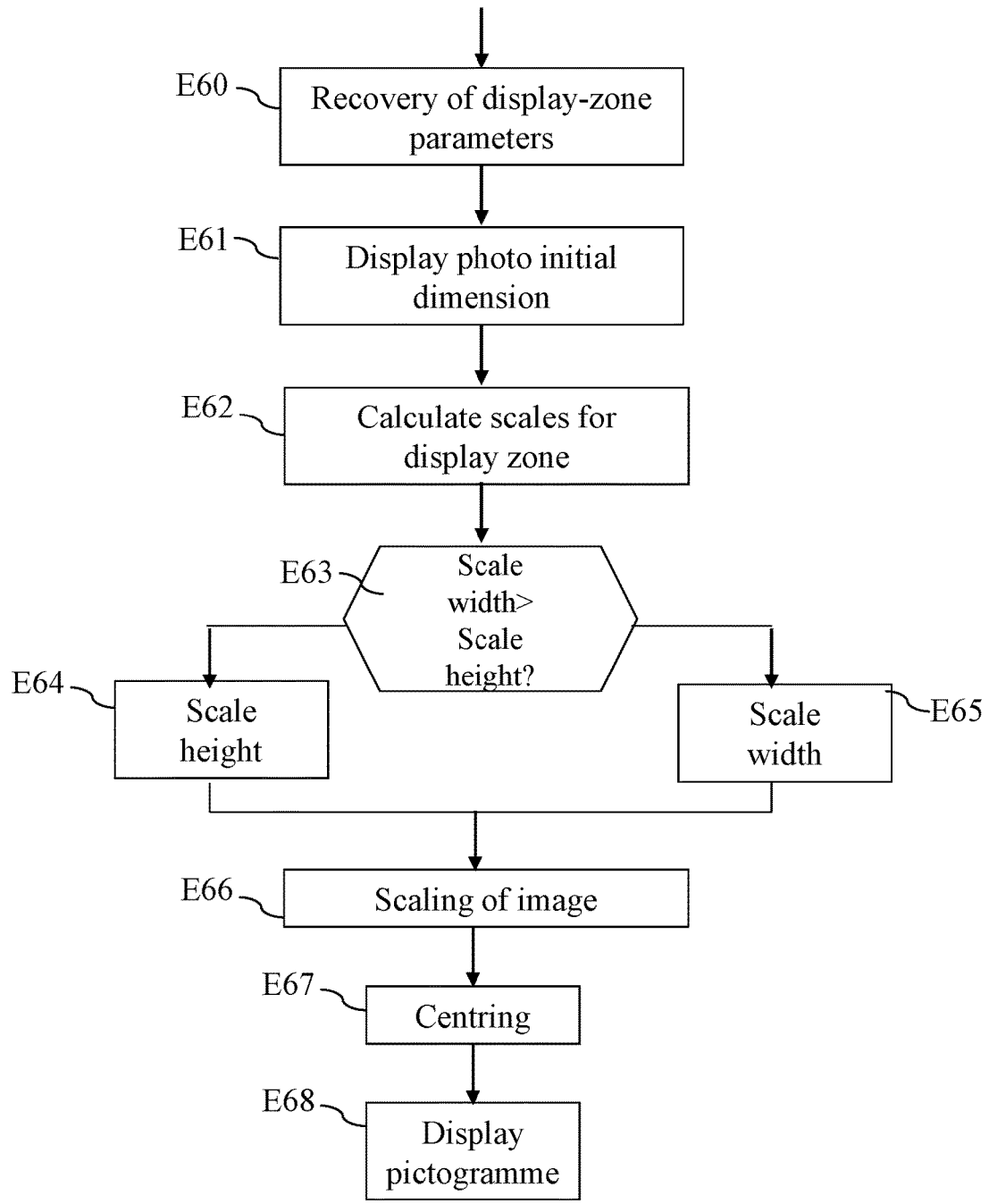
FIG. 6 shows an example of an algorithm executed by the home-automation control device for managing the various orientations of the display of home-automation commands according to the present invention.

FIG. 6 shows an example of an algorithm executed by the home-automation control device for managing the various orientations of the display of home-automation commands according to the present invention.

More precisely, the present algorithm is executed by the processor 200 of the home-automation control device Com.

The present algorithm is implemented at each modification of the orientation of the home-automation control device Com. At each modification of the orientation of the home-automation control device Com, the information displayed on the screen 206 changes from portrait mode to landscape mode and vice versa.

At step E60, the processor 200 obtains the parameters of the display zone of the screen 206. The parameters of the display zone are the dimensions and position in the screen of the zone available for display of the view as shown in FIG. 4 and the orientation of the view in the screen.

The dimensions are denoted screensize(width), screensize(height) and the position the coordinates of which are denoted screenposition(x) and screenposition(y).

At step E61, the processor 200 demands the display of the view as shown in FIG. 4 according to its initial dimensions. For example, the initial dimensions correspond to the orientation thereof when the picture is taken by the user at step E52 in FIG. 5. The processor 200 obtains the dimensions of the picture at this same step. The initial dimensions are denoted photosize(width), photosize(height).

At the following step E62, the processor 200 calculates the scales in width scalewidth and height scaleheight of the picture for adaptation thereof to the display zone.

For this purpose, the processor 200 uses the following formulae:

$$Scalewidth = screensize(width)/photosize(width)$$

$$Scaleheight = screensize(height)/photosize(height)$$

At the following step E63, the processor 200 compares the width scalewidth and height scaleheight scales.

If scalewidth is greater than scaleheight, the processor 200 moves to step E64. Otherwise the processor 200 moves to step E65.

At step 64, the processor 200 determines a scale factor denoted scale that is equal to scaleheight.

Once this operation is performed, the processor 200 moves to step E66.

At step E65, the processor 200 determines the scale factor scale as being equal to scalewidth.

Once this operation has been performed, the processor 200 moves to step E66.

At step E66, the processor 200 modifies the size of the view as shown in FIG. 3 by means of the scale factor scale.

At the following step E67, the processor 200 positions the view as shown in FIG. 4 at the centre of the screen 206. The position of the view has the following coordinates photo(x) and photo(y).

The view is positioned using the following formulae:

$$photo(x) = screenposition(x) + screenposition(width)/2$$

$$photo(x) = screenposition(y) + screensize(height)/2.$$

At the following step E68, the processor 200 demands the display of the icons at the corresponding positions in the resized image.

Figure 7:
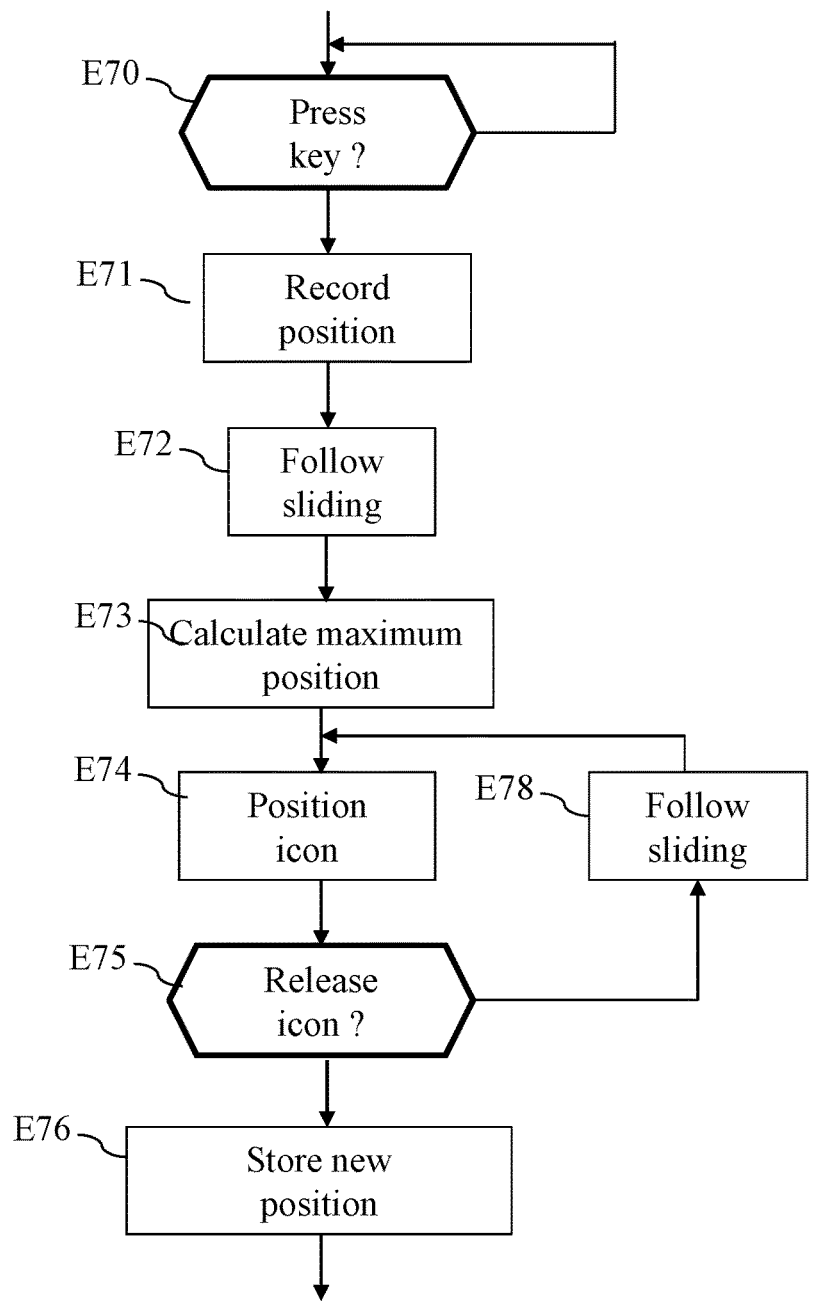
FIG. 7 shows an example of an algorithm executed by the home-automation control device for managing modifications to the positioning of icons according to the present invention.

FIG. 7 shows an example of an algorithm executed by the home-automation control device for managing modifications to the positioning of the icons according to the present invention.

More precisely, the present algorithm is executed by the processor 200 of the home-automation control device Com.

At step E70, the processor 200 checks whether a pressing on an icon inserted according to the present invention is performed. If so, the processor moves to step E71, if not the processor 200 returns to step E70.

At the following step E71, the processor 200 records the coordinates of the icon on the screen. The coordinates of the icon are denoted currposition(x) and currposition(y).

At the following step E72, the processor 200 obtains from the screen 206 information representing the movement of the icon that the user of the home-automation control device Com wishes to make. The user of the home-automation control device Com, by moving his finger on the screen, indicates the position that he wishes the icon to adopt.

At the following step E73, the processor 200 determines the extreme positions that the icon can adopt in the view in FIG. 3.

At the following step E74, the processor 200 controls the positioning of the icon to the last position required by the user of the home-automation control device Com if this is comprised in the extreme positions determined. If it is not comprised in the extreme positions determined, the processor 200 controls the positioning of the icon to the maximum position closest to the last position required by the user.

At the following step E75, the processor 200 checks whether the user of the home-automation control device Com has interrupted the movement of the icon. For this purpose, the processor 200 obtains from the screen 206 information representing an interruption of the pressing of the finger of the user of the home-automation control device Com on the screen 206.

If so, the processor 200 moves to step E76.

If not, the processor 200 moves to step E78.

At step E78, the processor 200 obtains from the screen 206 information representing the movement of the icon that the user of the home-automation control device Com wishes to make and returns to step E74.

At step E76, the processor 200 stores the position of the icon at the last position required by the user of the home-automation control device Com if this is comprised in the extreme positions determined. If this is not comprised in the extreme positions determined, the processor 200 stores the maximum position closest to the last position required by the user.

Figure 8:
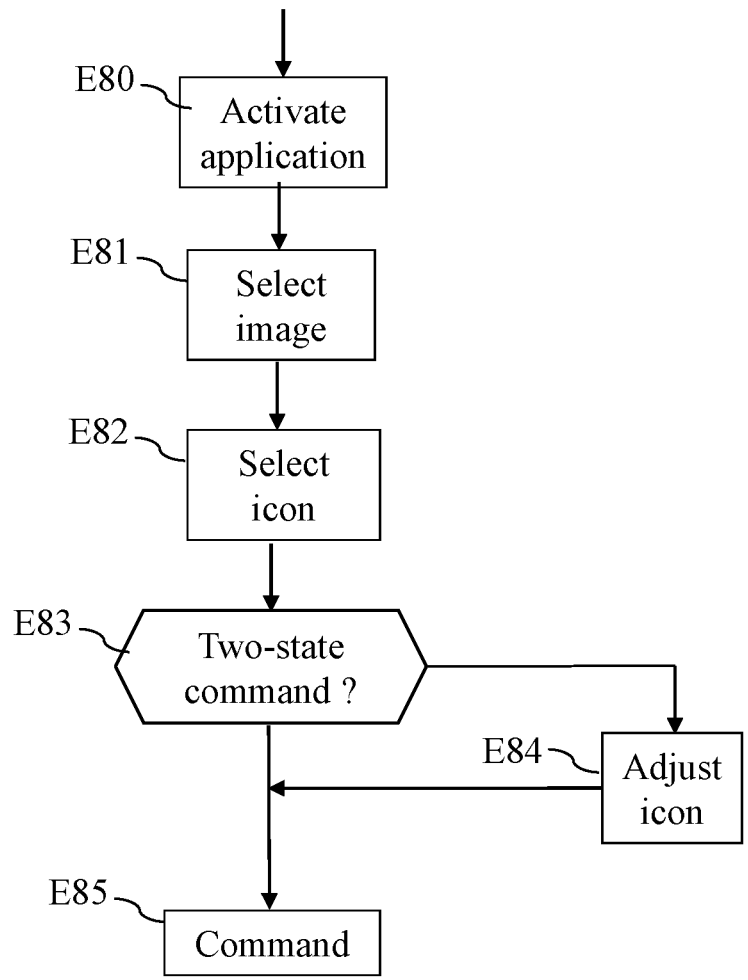
FIG. 8 shows an example of an algorithm executed by the home-automation control device for controlling home-automation devices according to the present invention.

FIG. 8 shows an example of an algorithm executed by the home-automation control device for controlling home-automation devices according to the present invention.

More precisely, the present algorithm is executed by the processor 200 of the home-automation control device Com.

At step E80, the processor 200 detects the activation of the home-automation application by the user of the home-automation control device Com. When the application is activated, the processor 200 demands the display on the screen 206 of a view as shown in FIG. 3.

At the following step E81, the processor 200 detects the selection of a reduced image by the user of the home-automation control device Com.

At the following step E82, the processor 200 detects the selection of an icon by the user of the home-automation control device Com.

At the following step E83, the processor 200 checks whether the selected icon corresponds to a two-state command or a command with more than two states. A two-state command corresponds to a start/stop command. A command with more the two states corresponds for example to the establishment of a heating instruction or a partial opening of a curtain or blind device or a variation in light intensity of a lighting device.

If the icon selected corresponds to a two-state command, the processor 200 moves to step E85. If not, the processor 200 moves to step E84.

At step E84, the processor 200 demands the display of an icon for establishing instructions. An example of an icon for establishing an instruction is given with reference to FIG. 9.

Once this operation is performed, the processor 200 moves to step E85.

At step E85, the processor 200 controls the radio interface in order to establish a communication with the central unit CE placed in the dwelling. The central unit transfers the command to the home-automation device associated with the selected icon and in return receives a confirmation of the execution of the command. On reception of the command, the central unit CE transfers a message of confirmation of the execution of the command to the control device. The processor 200 then modifies the visual appearance of the icon.

Figure 9:
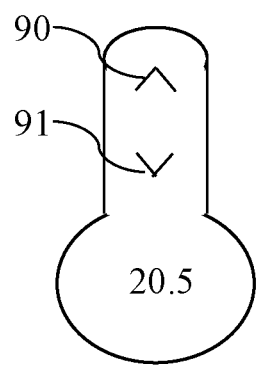
FIG. 9 shows an example of an icon used by the present invention for establishing an instruction.

FIG. 9 shows an example of an icon used by the present invention for establishing an instruction for a heating and/or air-conditioning system.

The arrows denoted 90 and 91 enable the user of the home-automation control device to increase or decrease a set temperature which, in the example in FIG. 9, is 20.5 degrees.

Naturally the present invention is in no way limited to the embodiments described here, but quite the contrary encompasses any variant within the capability of a person skilled in the art.

The invention claimed is:

1. A method for controlling home-automation devices in a dwelling, wherein the home-automation devices are controlled by a control device comprising a touch screen and which sends each command to a central unit that redirects the command to the home-automation device being controlled, the central unit being connected by radio link to the home-automation devices, the method comprising the steps of:

determining, by the central unit using the radio link, of the list of home-automation devices;

associating, using the control device, of each home-automation device with an icon and with an alphanumeric identifier;

obtaining by the control device of an image of at least part of the dwelling;

displaying by the control device of the image on the touch screen;

detecting by the control device of a selection of an icon from a list of icons;

detecting by the control device of a positioning of the icon in the image and storage of the position of the icon determined;

detecting by the control device of a pressing on the image at the position of the icon stored;

generating by the control device of a command to the central unit and to the home-automation device with which the icon is associated or display of another icon linked to the icon, the position of which is stored if the pressing at the position of the icon in the image is detected, wherein other images are obtained of the dwelling;

displaying, by the control device, of reduced images of the other images obtained;

detecting by the control device of a selection of a reduced image of another image;

displaying of the other image corresponding to the reduced image selected;

detecting by the control device of a selection of an icon from a list of icons;

detecting by the control device of a positioning of the icon in the other image and storage of the position of the icon determined;

detecting by the control device of a pressing on the other image at the position of the stored icon; and generating by the control device of a command to the central unit and intended for the home-automation device with which the icon is associated or display of another icon linked to the icon the position of which is stored if the pressing at the position of the icon in the image is detected.

2. The method according claim 1, wherein the method further comprises the steps of:

obtaining by the control device of a command to modify the visual appearance of the icon positioned in the image; and modifying by the control device of the visual appearance of the icon positioned in the image.

3. The method according to claim 2, wherein the modification of the positioning of the icon consists of making the icon translucent or reducing the size of the icon.

4. The method according to claim 1, wherein the home-automation devices are electrical appliances, sensors, lighting systems, blind or curtain devices, a heating system or an alarm unit.

5. The method according to claim 1, wherein the other icon linked to the icon the position of which is stored is a three state command.

6. The method according to claim 1, wherein the other icon linked to the icon the position of which is stored consists of an invitation to enter a password.

7. The method according to claim 1, wherein the method further comprises a step of disconnecting steps of selecting an icon from a list of icons, of the obtaining by the control device of an image of at least part of the dwelling, of the detection by the control device of a selection of an icon from a list of icons and of the detection by the control device of a positioning of the icon in the image and storage of the position of the icon determined.

8. A system for controlling home-automation devices in a dwelling, wherein the home-automation devices are controlled by a control device comprising a touch screen and which sends each command to a central unit that redirects the command to the home-automation device being controlled, the central unit being connected by radio link to the home-automation devices, the system comprising:
   circuitry causing the central unit, using the radio link, to determine the list of home-automation devices;
   circuitry causing the control device, to associate each home-automation device with an icon and with an alphanumeric identifier;
   circuitry causing the control device to obtain an image of at least part of the dwelling;
   the control device, for displaying the image on the touch screen;
   circuitry causing the control device, to detect a selection of an icon from a list of icons;
   circuitry causing the control device, to detect a positioning of the icon in the image and storing the position of the icon determined;
   circuitry causing the control device, to detect a pressing on the image at the position of the icon stored;
   circuitry causing the control device, to generate a command at the central unit and intended for the home-automation device with which the icon is associated or displaying another icon related to the icon the position of which is stored if the pressing at the position of the icon in the image is detected, wherein other images are obtained of the dwelling
   circuitry causing the control device to display reduced images of other images obtained;
   circuitry causing the control device to display a selection of a reduced image of another image;
   circuitry causing the control device to display the other image corresponding to the reduced image selected;
   circuitry causing the control device to detect a selection of an icon from a list of icons;
   circuitry causing the control device to detect a positioning of the icon in the other image and storage of the position of the icon determined;
   detecting by the control device of a pressing on the other image at the position of the stored icon; and
   circuitry causing the control device to generate a command to the central unit and intended for the home-automation device with which the icon is associated or display of another icon linked to the icon the position of which is stored if the pressing at the position of the icon in the image is detected.

9. A computer program product embodied in a non-transitory storage medium, the computer program product comprising instructions for implementing, by a system, the method according to claim 1 when said computer program product is executed by the system.

* * * * *